United States Patent Office 2,957,881
Patented Oct. 25, 1960

2,957,881

NEW ACYLPIPERIDINES

Karl Hoffmann, Binningen, and Ernst Sury, Basel, Switzerland, assignors to Ciba Pharmaceutical Products Inc., Summit, N.J., a corporation of New Jersey No Drawing. Filed Mar. 3, 1958, Ser. No. 718,415

Claims priority, application Switzerland Mar. 19, 1957

9 Claims. (Cl. 260—294.7)

This invention provides as new compounds diphenyl-methyl-piperidines, more especially 2-diphenyl-methyl-piperidines which are substituted at the piperidine nitrogen atom by an amino-lower alkanoyl residue N-substituted by a lower aliphatic radical, and salts thereof. The compounds may also be substituted in the rings; and especially the phenyl residues may contain one or more lower alkyl or alkoxy groups such as methyl, ethyl, methoxy, ethoxy or halogen atoms such as bromine or chlorine. The aminoalkanoyl radical may be straight or branched, and is preferably an aminoacetyl, aminopropionyl or amino-isopropionyl radical. The amino group is a secondary or tertiary amino group. The substituents which the amino group may contain are alkyl radicals, preferably containing 1–5 carbon atoms, or alkylene radicals, which may be interrupted by hetero-atoms. The amino group is, for example, a diethylamino isopropylamino, n-amylamino, pyrrolidino, or piperidino, group.

The compounds of this invention exhibit a local anaesthetic action and are useful as medicaments. Of special importance is 1-diethylamino-acetyl-2-diphenyl-methyl-piperidine and salts thereof.

The new piperidines and their salts are obtained by introducing in a manner in itself known an aminoalkanoyl radical N-substituted by a lower aliphatic radical into a secondary diphenyl-methyl-piperidine, and especially by reacting a diphenyl-methyl-piperidine with an alkane acid or a functional derivative thereof, such as an acid chloride, anhydride or ester thereof, and which acid contains an amino group substituted as defined above or a substituent convertible into such an amino group, and, when the compounds so obtained contain a substituent convertible into a substituted amino group, so converting the said substituent, and, if desired, converting the resulting compound into a salt thereof. A substituent convertible into an amino group is, for example, a halogen atom which can be converted into a substituted amino group by reaction with a primary or secondary amine. The invention also includes any modification of the process in which there is used as starting material an intermediate product obtainable at any stage of the process and the remaining steps are carried out. Depending on the procedure used the new compounds are obtained in the form of their bases or salts. From the salts the free bases can be obtained. From the bases salts can be prepared, such as those of hydrohalic acids, sulfuric acid, nitric acid, phosphoric acid, acetic acid, propionic acid, oxalic acid, malic acid, citric acid, methane sulfonic acid, ethane sulfonic acid, oxyethane sulfonic acid, benzoic acid, salicylic acid, para-aminosalicylic acid, or toluene sulfonic acid.

The new compounds can be used as medicaments, for example, in the form of pharmaceutical preparations which contain the active substance in admixture with a pharmaceutical organic or inorganic, solid or liquid carrier suitable for topical administration. As carriers there come into consideration such substances as do not react with the new compounds, such as for example water, gelatine, lactose, starch, magnesium stearate, talc, vegetable oils, benzyl alcohols, gums, polyalkylene glacols, cholesterol or other known carriers for medicaments. The pharmaceutical preparations can be, for example, in the form of ointments or cremes or in liquid form as solutions, suspensions or emulsions. They may be sterilized and/or contain auxiliary substances, such as preserving, stabilizing, wetting or emulsifying agents, salts for modifying the osmotic pressure or buffers. They may also contain other therapeutically useful substances. The preparations are obtained by customary methods.

The following examples illustrate the invention:

Example 1

16 grams of 1-chloroacetyl-2-diphenylmethylpiperidine, dissolved in 100 cc. of ethyl acetate or benzene, are boiled under reflux for one hour with 10 grams of diethylamine. After cooling the mixture, it is extracted with dilute hydrochloric acid and the free base is liberated from the solution by means of caustic soda solution. The base is taken up in ether or ethyl acetate, the solution is washed until the washings are neutral and is dried over magnesium sulphate. By evaporating the solvent 17 grams of a crystalline base melting at 119–120° C. (after recrystallization from petroleum ether) remain behind. The product is 1-diethylaminoacetyl-2-diphenylmethyl-piperidine of the formula

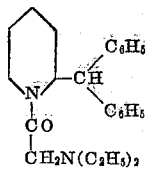

The 1-chloroacetyl-2-diphenylmethyl-piperidine used as starting material can be prepared, for example, by adding 24 grams of chloroacetyl chloride dropwise to 101 grams of 2-diphenylmethyl-piperidine (dissolved in 250 cc. of ethyl acetate) at −10 to −5° C. while stirring, the reaction mixture is then centrifuged for 2 hours at 25° C. and for a further 2 hours at 90–100° C., and then worked up. There are obtained 60 grams of a crystallizate melting at 162–163° C. (after recrystallization from isopropanol).

Example 2

11 grams of 1-chloroacetyl-2-diphenylmethyl-piperidine and 10 grams of dimethylamine, dissolved in 100 cc. of ethyl acetate, are maintained at 90° C. for 2 hours in a closed tube, and the reaction mixture is worked up as described in Example 1. There are obtained 9 grams of 1-dimethylaminoacetyl-2-diphenylmethyl-piperidine of the formula which melts at 94–95° C. Its hydrochloride (prepared by dissolving the base in ethyl acetate and introducing hydrogen chloride) melts at 130–131° C.

Example 3

From 11 grams of 1-chloroacetyl-2-diphenylmethyl-piperidine in 100 cc. of ethyl acetate and 10 grams of dibutylamine there are obtained in an analogous manner 13 grams of 1-dibutylamino-acetyl-2-diphenylmethyl-piperidine of the formula

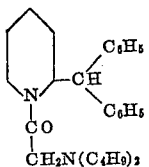

which melts at 156–157° C. after recrystallization from petroleum ether.

*Example 4*

From 11 grams of 1-chloroacetyl-2-diphenylmethyl-piperidine in 100 cc. of ethyl acetate and 6 grams of pyrrolidine there are obtained in an analogous manner 12 grams of 1-N-pyrrolidinoacetyl-2-diphenylmethyl-piperidine of the formula

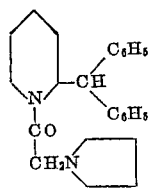

which melts at 115–116° C. after recrystallization from petroleum ether.

*Example 5*

From 11 grams of 1-chloroacetyl-2-diphenylmethyl-piperidine in 100 cc. of ethyl acetate and 7 grams of piperidine there are obtained in an analogous manner 11.5 grams of 1-N-piperidino-acetyl-2-diphenylmethyl-piperidine of the formula

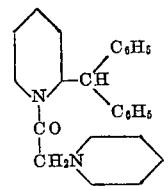

which melts at 120–121° C. after recrystallization from petroleum ether. Its hydrochloride prepared in the usual manner melts at 163–164° C.

*Example 6*

From 11 grams of 1-chloroacetyl-2-diphenylmethyl-piperidine in 100 cc. of ethyl acetate and 7 grams of morpholine there are obtained in an analogous manner 12 grams of 1-N-morpholinoacetyl-2-diphenylmethyl-piperidine of the formula

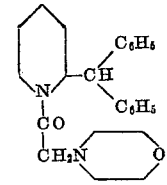

which melts at 139–140° C. after recrystallization from petroleum ether. Its hydrochloride prepared in the usual manner melts at 227–228° C.

*Example 7*

From 9 grams of 1-chloracetyl-2-diphenylmethyl-piperidine in 100 cc. of ethyl acetate and 6 grams of N-methyl-piperazine there are obtained in an analogous manner 11 grams of 1-[4′-methyl-piperazyl-(1′)-acetyl]-2-diphenylmethyl-piperidine of the formula

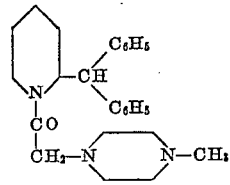

which melts at 144–145° C. after recrystallization from petroleum ether. Its dihydrochloride prepared in the usual manner decomposes at 190° C.

*Example 8*

20 grams of diethylaminoacetyl chloride hydrochloride are slowly added with stirring and cooling to 12.5 grams of 2-diphenylmethyl-piperidine in 80 cc. of pyridine. When the reaction is complete, the mixture is poured on to water and the resulting 1-diethylamino-acetyl-2-diphenylmethyl-piperidine isolated. The product is identical with that of Example 1: it melts at 119–120° C. (petroleum ether).

*Example 9*

From 11 grams of 1-chloracetyl-2-diphenylmethyl-piperidine in 100 cc. of benzene and 8 grams of isopropylamine there are obtained in an analogous manner 8 grams of 1-isopropylaminoacetyl-2-diphenylmethyl-piperidine of the formula

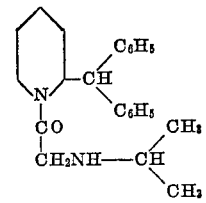

melting at 118–119° C. and boiling at 202–203° C. under 0.1 mm. pressure. Its hydrochloride is prepared by boiling the base with the calculated quantity of 1 N-hydrochloric acid, and it melts at 235–236° C.

*Example 10*

From 11 grams of 1-chloracetyl-2-diphenylmethyl-piperidine in 100 cc. of benzene and 12 grams of n-amylamine there are obtained in an analogous manner 12 grams of 1-n-amylaminoacetyl-2-diphenylmethyl-piperidine of the formula

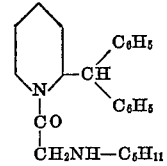

which boils at 215–217° C. under 0.1 mm. pressure.

*Example 11*

From 11 grams of 1-chloracetyl-2-diphenylmethyl-piperidine in 100 cc. of benzene and 12 grams of iso-amylamine there are obtained in an analogous manner 12 grams of 1-isoamylamino-acetyl-2-diphenyl-methyl-piperidine of the formula

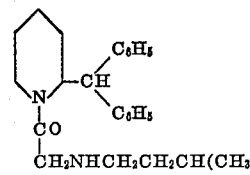

which boils at 217–219° C. under 0.1 mm. pressure.

Example 12

From 13 grams of 1-β-chloropropionyl-2-diphenyl-methyl-piperidine in 100 cc. of xylene and 6 grams of diethylamine there are obtained in an analogous manner 7 grams of 1-β-diethylaminopropionyl-2-diphenylmethyl-piperidine of the formula

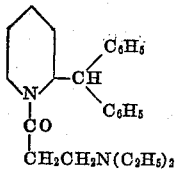

which melts at 100–101° C. after recrystallization from petroleum ether.

The above-mentioned starting material is obtained by reacting 51 grams of 2-diphenylmethyl-piperidine in 150 cc. of ethyl acetate with 13 grams of β-chloropropionyl chloride at −10 to 0° C. The product melts at 113–114° C. after recrystallization from isopropanol.

Example 13

From 11 grams of 1-β-chloropropionyl-2-diphenyl-methyl-piperidine in 100 cc. of xylene and 6 grams of morpholine there are obtained in an analogous manner 12 grams of 1-β-morpholino-propionyl-2-diphenylmethyl-piperidine of the formula

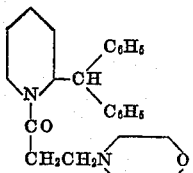

melting at 124–125° C. after recrystallization from petroleum ether.

Example 14

From 10 grams of 1-α-chloropropionyl-2-diphenyl-methyl-piperidine in 100 cc. of benzene and 6 grams of diethylamine there are obtained in an analogous manner 9 grams of 1-α-diethylamino-propionyl-2-diphenyl-methyl-piperidine of the formula

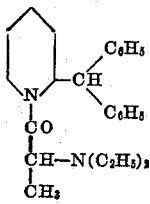

melting at 124–125° C. after recrystallization from petroleum ether.

The aforesaid starting material is obtained by reacting 10 grams of α-chloropropionyl chloride with 40 grams of 2-diphenylmethyl-piperidine at −10 to 0° C. The compound melts at 133–134° C. after recrystallization from a mixture of acetone and ether.

Example 15

From 10 grams of 1-α-chloropropionyl-2-diphenyl-methyl-piperidine in 10 cc. of benzene and 7 grams of morpholine there are obtained in an analogous manner 12 grams of 1-α-morpholinopropionyl-2-diphenylmethyl-piperidine of the formula

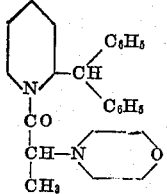

which melts at 140–141° C. after recrystallization from petroleum ether.

Example 16

If 10 grams of diethylamine are reacted with 9 grams of 1-chloracetyl-2-(para-chlorophenyl-phenyl-methyl)-piperidine in 100 cc. of benzene in an analogous manner to that described in Example 1, 8 grams of diethylamino-acetyl-2-(para-chlorophenyl-phenyl-methyl)-piperidine of the formula

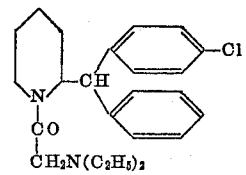

are obtained melting at 115–116° C. (petroleum ether).

Example 17

15 grams of 1-chloracetyl-3-diphenylmethyl-piperidine in 80 cc. of benzene are reacted with 10 grams of diethylamine as described in Example 1. There are obtained 10 grams of diethylaminoacetyl-3-diphenylmethyl-piperidine of the formula

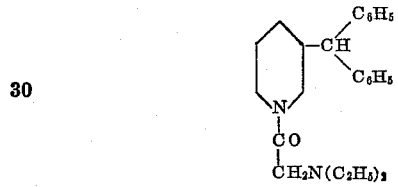

boiling at 243–246° C. under 0.1 mm. of pressure.

The starting material can be prepared, for example, by condensing 12.5 grams of 3-diphenyl-methyl-piperidine and 6 grams of chloracetyl-chloride in 80 cc. of glacial acetic acid and then adding sodium acetate solution.

Example 18

16 grams of 1-chloracetyl-4-diphenyl-methyl-piperidine in 80 cc. of benzene and 10 grams of diethylamine are reacted as described in Example 1 and yield 11 grams of 1-diethylaminoacetyl-4-diphenylmethyl-piperidine of the formula

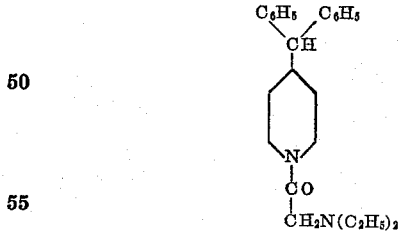

boiling at 237–239° C. under 0.07 mm. of pressure.

The above mentioned starting material can be obtained, for example, by condensing 12.6 grams of 4-diphenyl-methyl-piperidine, 6 grams of chloracetyl chloride and 6 grams of triethylamine in 100 cc. of benzene.

What is claimed is:

1. A member selected from the group consisting of di-phenylmethyl-piperidines of the formula

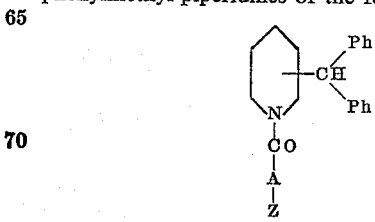

wherein A stands for lower alkylene and Z for a member selected from the group consisting of lower alkyl-amino, di-lower alkylamino, pyrrolidino, piperidino, morpholino and 4-methyl-piperazino, and Ph represents a member selected from the group consisting of phenyl, and phenyl substituted by lower alkyl, lower alkoxy and halogen, and non-toxic acid addition salts of such compounds.

2. 1-N-lower alkyl-amino-lower alkanoyl-2-diphenyl-methyl-piperidine.

3. 1 - N,N - di - lower alkyl - maino - lower alkanoyl-2-diphenylmethyl-piperidine.

4. 1-diethylaminoacetyl-2-diphenylmethyl-piperidine.

5. 1-isopropylaminoacetyl-2-diphenylmethyl-piperidine.

6. 1-n-amylaminoacetyl-2-diphenylmethyl-piperidine.

7. 1-N-pyrrolidinoacetyl-2-diphenylmethyl-piperidine.

8. 1-N-piperidinoacetyl-2-diphenylmethyl-piperidine.

9. The non-toxic acid addition salts of 1-diethylaminoacetyl-2-diphenylmethyl-piperidine.

No references cited.

UNITED STATES PATENT OFFICE
CERTIFICATION OF CORRECTION

Patent No. 2,957,881                              October 25, 1960

Karl Hoffmann et al.

It is hereby certified that error appears in the above numbered patent requiring correction and that the said Letters Patent should read as corrected below.

Column 4, line 22, for "Example 1:" read -- Example 1; --; column 5, line 37, for "melting at 124-125° C." read -- which melts at 130-131° C. --; column 7, line 8, for "maino" read -- amino --.

Signed and sealed this 20th day of June 1961.

(SEAL)
Attest:

ERNEST W. SWIDER                                          DAVID L. LADD
Attesting Officer                                           Commissioner of Patents